United States Patent [19]

Vishnitsky

[11] Patent Number: 4,752,367
[45] Date of Patent: Jun. 21, 1988

[54] APPARATUS AND METHOD FOR ELECTROCHEMICALLY SMOOTHING OR FINISHING A SURFACE OF A CONDUCTIVE METAL PART

[75] Inventor: Alexander Vishnitsky, Henrietta, N.Y.

[73] Assignee: Cation Corporation, Rochester, N.Y.

[21] Appl. No.: 48,012

[22] Filed: May 8, 1987

[51] Int. Cl.[4] .................... C25D 17/10; B23H 3/00; B23H 9/02
[52] U.S. Cl. .................... 204/129.5; 204/212; 204/222; 204/224 M; 204/225
[58] Field of Search ............... 204/224 M, 225, 129.5, 204/212, 129.55

[56] References Cited

U.S. PATENT DOCUMENTS 3,467,593  9/1969  Dickson et al. .............. 204/129.5 X
3,857,764  12/1974  Jumer ......................... 204/212 X
4,439,660  3/1984  Inoue ......................... 204/212 X
4,486,279  12/1984  Fromson et al. ............... 204/129.5

Primary Examiner—Donald R. Valentine
Attorney, Agent, or Firm—Cumpston & Shaw

[57] ABSTRACT

An apparatus and method are disclosed for electrochemically finishing or smoothing an irregular anode surface of a conductive metal part while removing a minimum of metal from the anode surface. The smoothing or finishing of irregular surfaces, such as burred surfaces, for example, is achieved by mounting the face of a cathode member adjacent the anode surface to be finished to define a minimum gap therebetween and moving the face relative to the anode surface while subjecting the face and anode surface to a flow of electrolyte fluid through the gap. An electrical power means is coupled to the face and anode surface for generating a current therebetween through the electrolyte for electrochemically finishing the burred anode surface with a minimum removal of metal therefrom.

5 Claims, 2 Drawing Sheets

APPARATUS AND METHOD FOR ELECTROCHEMICALLY SMOOTHING OR FINISHING A SURFACE OF A CONDUCTIVE METAL PART

BACKGROUND OF THE INVENTION

1. Field of the Invention:

This invention relates generally to material removal, and more specifically to an apparatus and method for electrochemically smoothing or finishing an irregular surface of a conductive metal part.

2. Description of the prior art:

Electrochemical finishing or smoothing of conductive metal parts is a well-known process in which irregular metal surfaces such as burred metal surfaces or the like, are removed from a conductive metal part. In the process, a stationary conductive metal part (anode) is connected to the positive post of a rectifier, and a separate stationary conductive metal part (cathode) mounted adjacent the anode is connected to the negative post of the rectifier. A face of the cathode is mounted adjacent the anode surface to be finished to define a gap therebetween, which is filled with an electrolyte fluid. The irregular anode surface or burr is electrochemically dissolved or removed by anodic action, that is, by current flow from the anode surface through the electrolyte to the face of the cathode. In this known process, any contact between the stationary anode surface and stationary cathode face must be avoided to prevent an electrical short circuit therebetween which may damage the anode or cathode. Therefore, to prevent contact, the gap between the anode surface and the cathode face is maintained at about 0.020 inch (0.051 cm) to accomodate the irregular width of the burrs which are inconsistent.

During the electrochemical process, the burr is removed along with some adjacent anode metal, resulting in a rounded corner surface as shown for example by the dotted line in FIG. 1. Assuming a gap of 0.020 inch (0.051 cm) and a burr of 0.040 inch (0.102 cm), for a total total incremental distance of 0.060 inch (0.153 cm), the removal rate of anode metal to the removal rate of the burr is equal to the ratio of the gap to the total incremental distance, or a ratio of 1:3. Accordingly, removal of the burr will result in the removal of adjacent anode metal of about 0.013 inch (0.033 cm). This presents a problem in that too much metal is removed from anode surface, which can deleteriously affect the strength characteristics of the part by decreasing the thickness of the wall at the corner. This problem can be overcome in the prior art by masking the corner adjacent to the burr with insulating material to prevent electrochemical dissolution of the metal at the corner, resulting in a square corner. However, masking the corner surfaces is a difficult and time consuming process, particularly where the anode surface is in a hard-to-get at location.

An electrochemical grinding machine is also known in the art comprising a rotatable diamond wheel made of electrically conductive metal to which diamond chips are secured at the periphery thereof. The wheel forms a cathode connected to the negative terminal of a power rectifier. A fixed metal part to be ground by the diamond wheel forms an anode connected to the positive terminal of the rectifier. Grinding of the metal part is achieved by spraying an electrolyte fluid between the diamond wheel and metal part, connecting electrical power from the rectifier to the cathode and anode, and simultaneously rotating the diamond wheel while advancing it across the metal part. With this grinding machine, approximately 10% of metal is removed from the metal part by grinding and 90% removed by electrochemical anodic action.

SUMMARY OF THE INVENTION

In accordance with a preferred embodiment of the invention, an apparatus is disclosed for electrochemically smoothing or finishing an irregular anode surface of an electrically conductive metal part, comprising:

a metallic anode member having a surface to be finished;

a cathode member mounted adjacent the anode member and having a face adjacent the surface;

means for moving one of the face and the surface relative to the other;

means subjecting the face and the surface to an electrolyte fluid; and electrical power means coupled to the anode and cathode members for generating current between the face and the surface through the electrolyte fluid for electrochemically finishing the surface while removing a minimum of metal therefrom.

In a more specific aspect of the invention, the cathode member is cylindrical and rotatably movable about the fixed axis, and the face of the cathode member is spaced from the surface of the anode member to form a gap therebetween of a predetermined minimum distance.

In still another aspect of the invention, a method is disclosed for electrochemically smoothing or finishing the surface of a conductive metallic anode member mounted adjacent a cathode member which has a face facing the surface and spaced therefrom to form a gap therebetween of a minimum distance. The method comprises the steps of:

moving one of the face and the surface relative to the other about a fixed axis;

subjecting the face and the surface to an electrolyte fluid during movement of one of the face and anode surface; and generating an electrical current between the face and the surface through the electrolyte fluid for electrochemically finishing the anode surface while removing a minimum of metal therefrom.

The present invention overcomes the problem of the prior known electrochemically finishing process by providing a cathode face and anode surface spaced-apart with a minimum gap therebetween of about 0.001 inch (0.003 cm). This minimum gap is made possibly by making one of the cathode face and anode surface movable relative to the other, thereby eliminating any possible damage to the anode or cathode caused by an electrical short circuit between the cathode face and anode surface, even in those instances where moving contact between the face and surface occur. It has been found that where the cathode face and anode surface are moving relative to one another, damage to the anode does not occur, even though some contact occurs between the cathode face and anode surface. In the prior known electrochemical finishing process, any contact between a fixed cathode face and fixed anode surface results in a short, causing damage to the anode member. To eliminate possible damage due to shorting in the prior known process, it was necessary to maintain a large gap, of about 0.020 inch (0.051 cm), between the cathode face and anode surface, thereby resulting in the removal of excess metal of about 0.013 inch (0.003 cm) from the anode surface. Using the same parameters, the minimum gap of about 0.001 inch (0.003 cm) of the present invention results in the removal of a minimum amount of metal from the corner of about 0.001 inch (0.003 cm), resulting in a substantially square corner.

BRIEF DESCRIPTION OF THE DRAWINGS

In the detailed description of the invention presented below, reference is made to the accompanying drawings, in which.

DETAILED DESCRIPTION OF THE INVENTION

Figure 1:
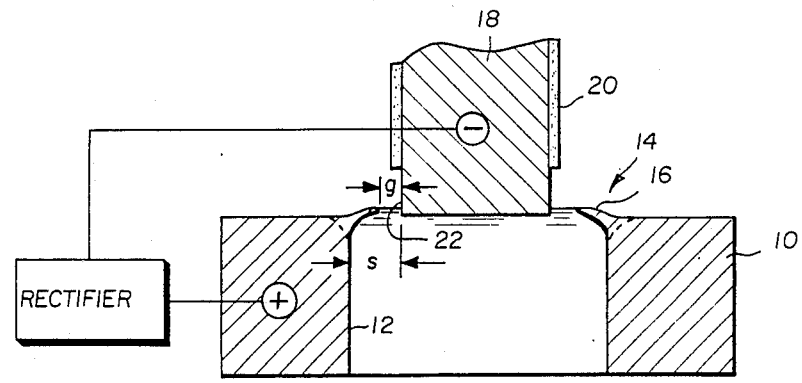
FIG. 1 is a side-elevation view in section of a prior known apparatus for electrochemically smoothing or finishing the anode surface of a conductive metallic part.

Referring now to FIG. 1 of the drawing, a prior known electrochemical deburring apparatus is illustrated. The apparatus comprises a stationary anode member 10, made of an electrically conducting material, such as aluminum, stainless steel or iron, for example. The anode member 10 may be an impeller bearing cage, gear, fitting or the like. The anode member 10 is ordinarily formed by any suitable casting, forging stamping or machining operation, and is shown with an exemplary bore 12 defining an annular corner surface 14 with an irregular surface, such as a burr 16 extending therefrom. Mounted adjacent the bore 12 is a stationary cathode member 18 of an electrically conducting material having the upper portion 20 thereof covered by an insulator. The lower end of cathode member 18 has a face 22 facing anode corner surface 14 and burr 16. The anode member 10 is connected to a positive terminal of a rectifier of an electrical power source and the cathode member is connected to the negative terminal of the rectifier. The cathode face 22 and anode corner surface 14 are subjected to an electrolyte or saltwater fluid of any suitable type, such as sodium chloride, sodium nitride, sodium nitrate, or sodium sulphate, by any suitable means such as immersing the anode and cathode members in an electrolyte fluid bath, or by spraying or forcing an electrolyte fluid through the gap "g" between the cathode face and anode surface. To accommodate the various widths of burr 16, and to insure that no possible short will occur between cathode face 22 and anode surface 14 which would damage the anode member, the gap provided between the cathode face 22 and anode surface is about 0.020 inch (0.051 cm). Since the removal rate of metal from the anode to the removal rate of metal from the burr is equal to the ratio of the gap "g" to the total space "s" (equal to the sum of the gap and width of the burr), assuming a large burr of 0.040 inch (0.102 cm), a gap of 0.020 inch (0.051 cm) and a total space between cathode face 22 and anode 10 of 0.060 inch (0.153 cm), the removal rate of the anode to the burr is equal to 0.020:0.060 or 1:3. Accordingly, removal of the burr of 0.040 inch (0.102 cm) by the electrochemical action will result in the removal of anode surface material of 0.013 inch (0.330 mm), shown by dotted lines in FIG. 1. Such a high rate of removal of metal from the anode surface may deleteriously affect the anode member 10, requiring the added step of insulating portions of the anode corner surface by masking tape or the like, to prevent removal of such large amounts of metal.

Figure 2:
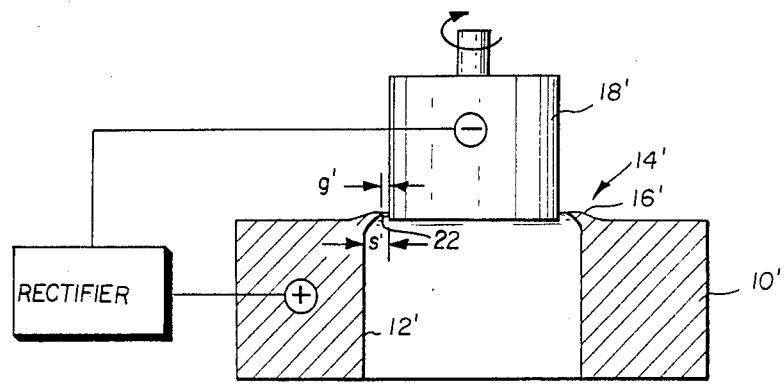
FIG. 2 is a side-elevation view in section of a preferred embodiment of the apparatus of this invention for electrochemically smoothing or finishing an anode surface of a conductive metallic part.
Figure 3:
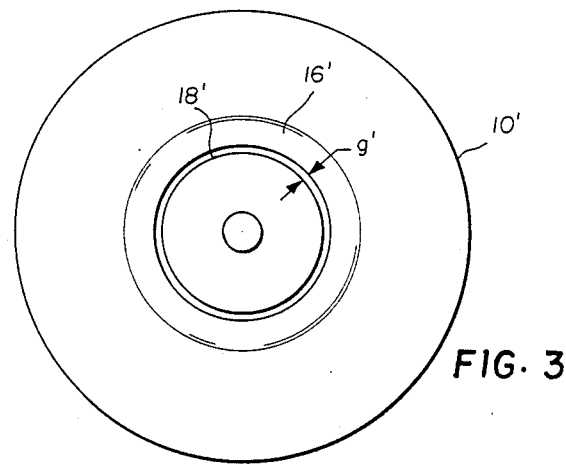
FIG. 3 is a top plan view of the apparatus of FIG. 2.

With reference to FIGS. 2 and 3, parts similar to parts shown in FIG. 1 will be denoted by the same numerals primed. The improved apparatus and method for electrochemically finishing or smoothing a surface of an electrically conductive part disclosed in FIGS. 2 and 3 comprises a stationary anode member 10' similar to the anode member 10 of FIG. 1, and a rotatable cathode member 18' having a cathode face 22' facing the anode corner surface 14' and forming a gap "g'" between burr 16' on the anode corner surface and the cathode face of about 0.001 inch (0.025 mm). The anode and cathode members (10' 18') are electrically connected to positive and negative terminals respectively of the rectifier of the electrical power source, as shown in FIG. 1, and similar means are provided to subject the cathode face and anode surface to an electrolyte fluid. Preferably a current density of 100–500 amperes per square inch of anode surface area is maintained at a voltage of 6 volts or more, preferably 8–12 volts.

Since the cathode face 22' is moved relative to the anode corner surface 14' containing burr 16' in this case by rotation of the cathode member preferably at a circumferential speed of about 15 feet per second, it is possible to reduce the gap to between about 0.001 to 0.010 inch (0.25 mm) preferably 0.003 inch (0.075 mm) or greater, without the danger of an electrical short occurring that would damage the anode member. Once again, assuming a burr 16' of a width of 0.040 inch (0.102 cm), a gap "g'" of 0.001 inch (0.025 mm) and a total space "s'" between the cathode face and anode surface of the sum of the burr and gap of 0.041 inch (0.104 cm), the removal rate of the anode 12' to the burr 16' is equal to the ratio of the gap to the total space, or 1:41. Accordingly, removal of the burr of 0.040 inch (0.102 cm) will result in the removal of anode metal of only 0.001 inch (0.025 mm) (compared to 0.013 inch (0.330 mm) for the prior art). The improved electrochemical finishing process is more controllable than the prior art process, and the small removal of the anode surface metal results in a substantially square corner surface without the need for masking the corner surface.

Figure 4:
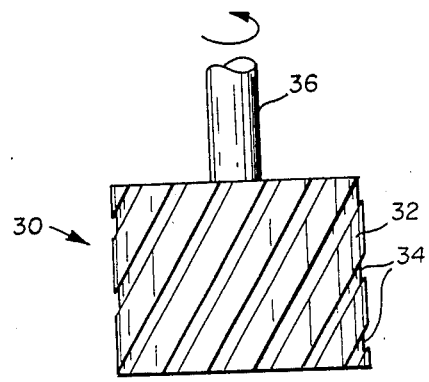
Figure 5:
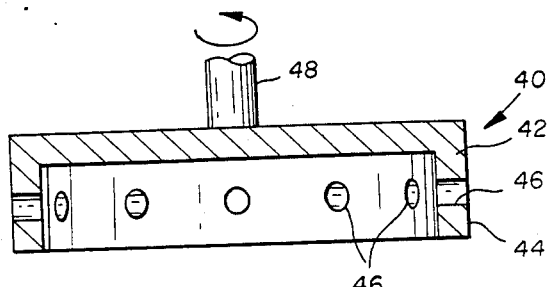
Figure 6:
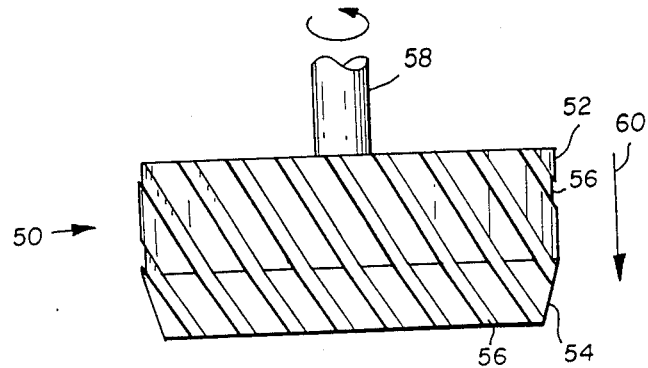

FIGS. 4–6 show cathode members in accordance with alternative embodiments of this invention. Cathode member 30 as shown in FIG. 4 has a generally cylindrical body 32 of substantially constant diameter and including a plurality of grooves 34 cut into the surface thereof. The tool is supported on a shaft 36 for rotation during smoothing in accordance with this invention. Grooves 34 in the surface of cathode 30 pump the electrolyte fluid through the gap between the face of the cathode and the anode surface. This insures that a continuous supply of electrolyte is available and enhances the smoothing process. This tool is especially designed for smoothing the inner surfaces of bores.

Cathode member 40 as shown in FIG. 5 includes a cup shaped cathode member 42 having a cylindrical lip 44 and a plurality of aperatures 46 formed therein. Aperatures 46 enhance the flow of fluid between the cathode and the anode member. Cathode member 40 is particularly designed for finishing the outside surfaces of round parts and is provided with a shaft 48 for rotation during processing.

In some instances, it is desirable to remove larger than normal burrs or other surface irregularities and to that end this invention provides a cathode 50 as shown in FIG. 6.

FIG. 6 shows a cathode tool generally similar to that shown in FIG. 4 but particularly designed for removing large burrs or finishing, especially rough surfaces.

Tool 50 includes a cylindrical upper portion 52 and a tapered conical lower portion 54. A plurality of grooves 56 is formed in the surface of the tool for pumping the electrolyte fluid through the gap between the anode and cathode as the tool is rotated. A shaft 58 is provided for mounting and rotating the tool. In use, the conical portion 54 of tool 50 is disposed adjacent the anode surface to be smoothed and rotated to produce a surface velocity at the periphery of the tube of at least about 15 ft. per second. As burrs or other surface irregularities are removed, the tool is advanced in the direction of arrow 60, so that the gap between the surface of the tool and the anode surface to be finished is reduced. This allows unusually large burrs to be removed without significant rounding of the corners on which the burrs are formed. Preferably, the tool is advanced toward the part to be deburred at a feed rate of between about 0.20 and 0.30" per second.

It is prefered in accordance with this invention that the cathode tools be rotated both in a clockwise direction and in a counter-clockwise direction during deburring. This insures that the material removal from the anode will be symmetrical. For example, when a 20 second deburring cycle is required, the tool would be rotated in a clockwise direction for 10 seconds and in a counter-clockwise direction for 10 seconds.

While a preferred embodiment of the invention has been shown and described with particularity, it will be appreciated that various changes and modifications may suggest themselves to one having ordinary skill in the art, on being apprised of the present invention. It is intended to encompass all such changes and modifications as fall within the scope and spirit of the appended claims.

What is claimed is:

1. An apparatus for electrochemically removing projections from the junction of a surface and a cylindrical bore of a stationary anode, comprising:

a cathode member mounted between at least 0.001 and 0.010 inches (0.025 and 0.25 mm) from the projection and having a surface adjacent the projection;

means subjecting the space between the surface of the cathode and the anode to an electrolyte fluid;

electrical power means coupled to the anode and cathode members for generating a current between the anode and the cathode through the electrolyte fluid for chamically removing the projection while removing a minimum of material from the adjacent surface; and means for continuously moving the cathode surface relative to the anode while said current is flowing.

2. An apparatus for electrochemical finishing of a surface according to claim 1 wherein the cathode member is cylindrical and rotatably movable about an axis coadial with the bore.

3. An apparatus for electrochemical finishing of a surface according to claim 2 wherein the face of the cathode member has at least one groove for pumping electrolyte through the gap.

4. An apparatus for electrochemical finishing of a surface according to claim 1 comprising means for moving the surface of the cathode member relative to the projection at about 15 feet or more per second.

5. A method for electrochemically removing a burr from the junction of a cylindrical bore and a surface of an electrically conductive stationary anode member mounted adjacent a cylindrical cathode member, the cathode member having a surface facing the burr, comprising the steps of:

spacing the outer surface of the cathode member no more than about 0.001 to 0.010 inches (0.025 to 0.25 mm) from the end of said burr;

generating an electrical current between the cathode and the anode through the electrolyte fluid for electrochemically finishing the surface while removing a minimum of metal therefrom;

continuously rotating the cathode member about a fixed axis coaxial with the bore at the speed of at least 15 feet per second relative to the burr during finishing; and subjecting the space between the anode and cathode to an electrolyte fluid during movement.

* * * * *